Patented June 6, 1950

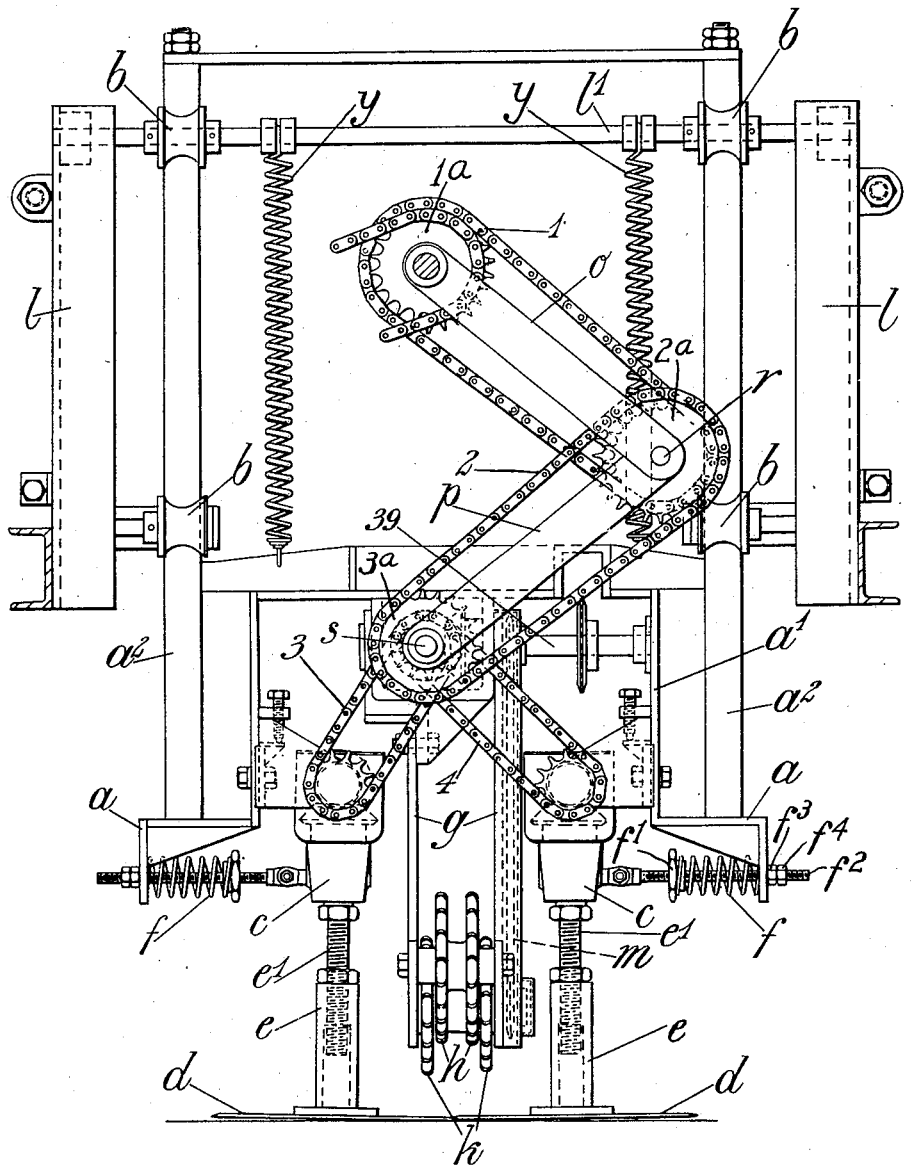

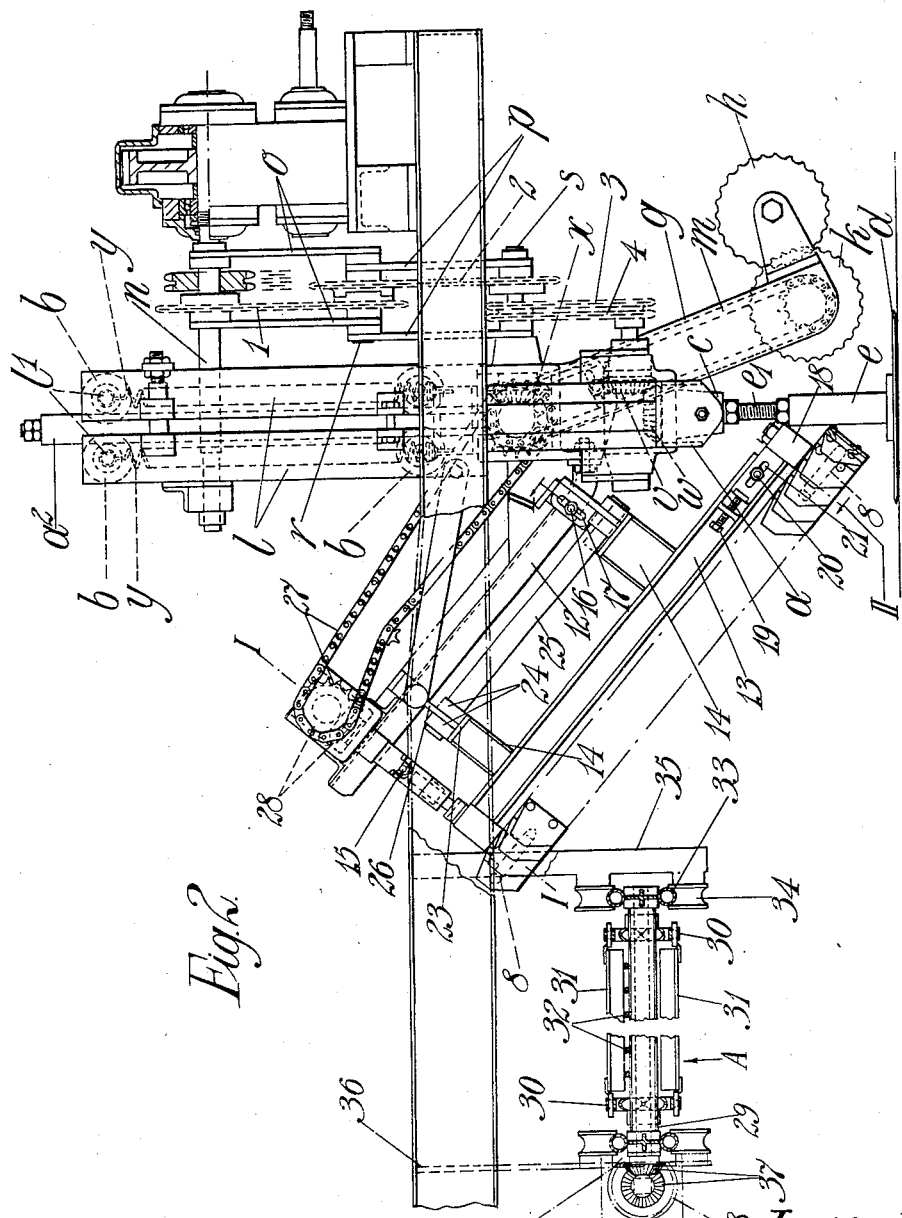

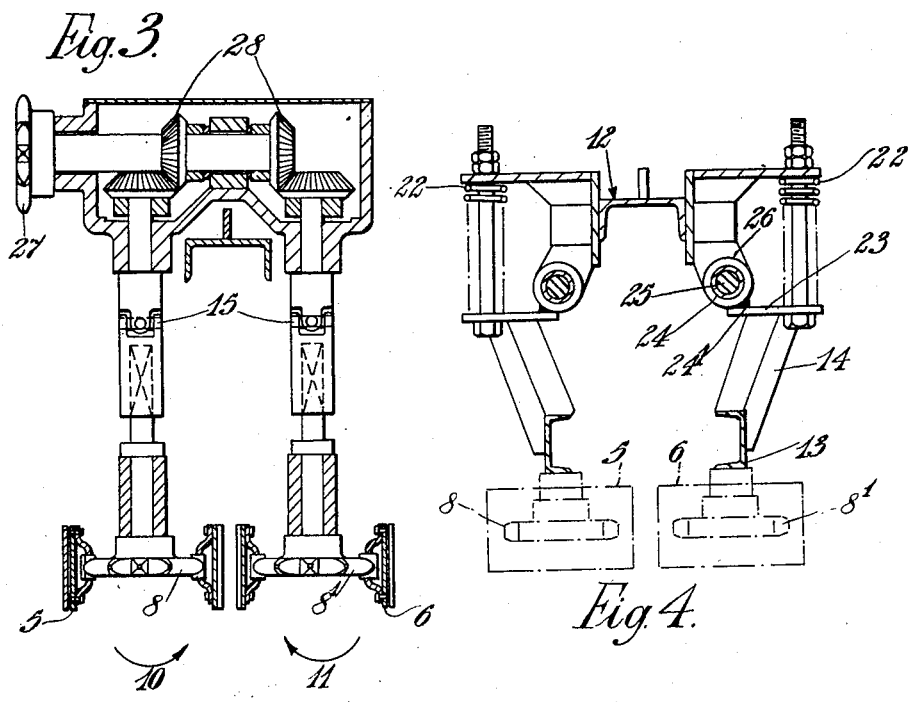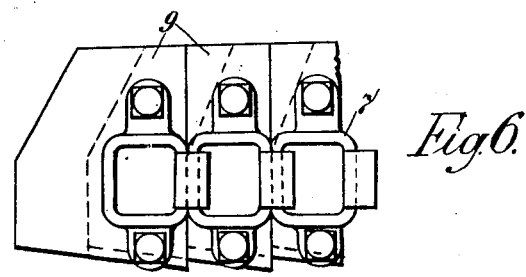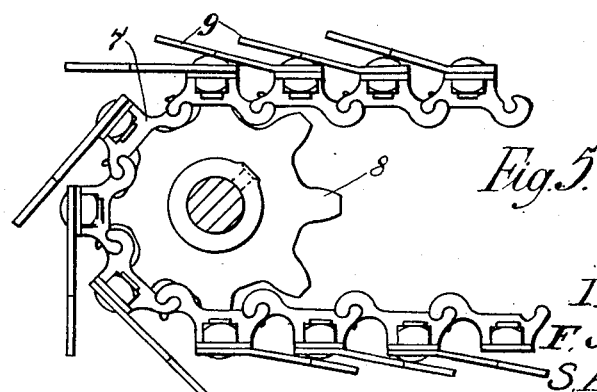

2,510,242

UNITED STATES PATENT OFFICE 2,510,242

MACHINE FOR LOCATING AND TOPPING SUGAR BEETS AND LIKE ROOT CROPS

Frederick John Minns, Stanley Albert Frank Court, and Norman Ellyard Langdale, Oxford, England, assignors to The Minns Manufacturing Company Limited, Oxford, England Application August 26, 1947, Serial No. 770,642
In Great Britain August 29, 1946

2 Claims. (Cl. 56—121.4)

This invention relates to the locating and topping unit of machines for topping, lifting and harvesting of sugar beet, whereby beet and like root crops are topped, lifted, cleaned and deposited in rows, and the tops disposed undamaged in uniform rows.

It is an essential requirement in the sugar beet industry that the crown of the beet, carrying the leaves, shall be sheared off square, i. e. at right angles to the longitudinal axis of the beet. It is also an essential requirement that the crown which is sheared off shall be as shallow as possible compatible with the removal of every trace of leaf.

The main object of the present invention is to construct a beet locating and topping unit which will provide for the topping requirements above referred to in a simple and effective manner, notwithstanding the non-uniformity of size and the amount of projection above the surface of the ground, which invariably characterises the growth of beet in a field.

According to one feature of the invention the topping unit consists of a floating frame carrying a combined finding and centering device associated with circular saws for cutting the tops.

In order to allow for the topping unit to rise and fall freely the drive for all the moving parts of the machine is taken through scissor type links pivoting about a fixed shaft.

Referring to the accompanying drawings,
Figure 1 is a front view of the machine, and
Figure 2 a side elevation, partly in section;
Figure 3 is a section along the line I—I in Figure 2, and
Figure 4 is a view along the line II—II seen in the direction of the arrows in Figure 2.
Figure 5 is a plan view of part of the endless sprocket driven chain for gripping the tops, and
Figure 6 shows a few links of the chain.

The topping unit comprises a floating framework $a$ consisting of a transverse member $a'$ and guiding columns $a^2$ and free to move in between guiding rollers $b$ fixed on the chassis of the machine. On this framework are pivotally mounted two gear boxes $c$ carrying the driven circular saws $d$ mounted on hollow spindles $e$ into which are screw-threaded rods $e'$ which are connected to the driving shafts in the gear boxes $c$. The said gear boxes are loaded laterally by springs $f$, each of which is mounted between the frame $a$ and a nut $f'$ on a screw-threaded rod $f^2$, which is pivotally attached to the gear box $c$ and passes through the frame $a$. A nut $f^3$ and locking nut $f^4$ on the rod $f^2$ outside the frame $a$ prevent the saws from moving inwardly more than is necessary to bring the blades to the cutting position. This arrangement allows stones etc. to pass between the saws without damaging their cutting edges.

The saws are located side by side with their inner cutting edges slightly overlapping one another, and immediately in front of them there is provided a combined finding and centering device $g$.

The positions of the saws can be adjusted and fixed vertically in relation to the base of the centering unit by displacement along the screw-threaded portion $e'$ of the spindles $e$. The centering unit is adjustable forwards or backwards in relation to the cutting saws.

The finding and centering device consists of two pairs of serrated wheels, the centres of the leading pair $h$ being about five inches in front of and about two inches higher than the centres of the trailing pair $k$. The leading pair are located side by side and close together while the trailing pair are located side by side but further apart. The leading wheels $h$ are free-moving, while the trailing pair $k$ are driven in the same direction as, but faster than the peripheral speed of, the road wheels by means of a suitably disposed sprocket and chain drive $m$.

Further the leading pair $h$ may be adjusted to vary the centre distance between the two pairs of wheels in order to cope with any variation in the relative sizes of beet crops in different districts.

The drive for all the moving parts of the topping unit is taken from the gear-box shaft $n$, by means of chains 1, 2, 3, 4 and sprockets 1a, 2a, 3a. The drive is taken through two pairs of scissor type links $o$ and $p$ which pivot about a floating shaft $r$, thus allowing for the topping unit rising and falling freely without variation in driving speed and for a relatively complicated transference of power to be effected in a small longitudinal space. Power is transmitted to the cutting saws from a shaft $s$ through the chain drives 3, 4 and bevel drives $v$ and $w$ mounted in the pinion boxes $c$. The finder wheels are driven from the same shaft $s$ through bevel gear $x$ and chain drive $m$.

The floating framework $a$ moves up and down freely so that variations in the amount of projection above the surface of the ground of the beet are easily coped with.

The amount of weight necessary to hold the beet in position while being topped may vary with different soils. For this purpose the floating frame $a$ is suspended from a fixed frame $l$ by adjustable tension springs $y$ attached to rods $l'$ which are fixed across to the frame $l$ and carry also the guiding rollers $b$. The springs $y$ can be adjusted to give varying loads on the beet and at the same time accelerate the downward motion of the unit, thereby also increasing the accuracy with which it "finds" both high and low growing beet.

As the machine is moved along the ground, the leading wheels or "finders" $h$ meet each succeeding beet and ride upon its "crown," guiding the rear pair of wheels $k$ to the "shoulder" (i. e. at the top, upon either side of the beet just above the ground where the leaf commences) to locate the height and lateral position of the saws $d$ so that each beet top is uniformly sheared off in respect of depth and squareness of cut. The disposition of these wheels is such as to hold the beet in position in the ground until the saws commence to cut and because the wheels are moving at a greater peripheral speed than the road wheels, they also tend to force the beet towards the oncoming saws, greatly adding to the accuracy of cut. Maximum accuracy in locating is obtained by utilising the "shoulder" of the beet as a location point and by using such a method, the leaves are undamaged and can subsequently be harvested in good condition.

Referring to the means for removing the tops (see also the detail Figures 3 to 6) it comprises a pair of endless belts 5 and 6 arranged to travel in opposite directions in an inclined plane and being independently laterally loaded to allow the distance between them to be automatically adjusted according to the size of the tops, which are discharged on a transversely moving endless belt conveyor, when they reach the summit of the inclined plane.

The belts are of special construction consisting of links 7 adapted to be engaged and driven by the sprockets 8, 8' and having secured thereto flaps 9 of impregnated rubber or like yielding material, which as the two belts rotate in the two opposite directions 10 and 11, gather the cut off tops with their leaves in between the two belts and carry them forward.

The belts and their drive are supported on the machine by a framework 12 attached to the machine and another framework 13, 14 the inclination of which is capable of adjustment in order to change the inclination of the endless belts, this being effected by pivoting around the universal joint 15; after adjustment of the inclination the framework 13, 14 is fixed in position by the screw 16 passing through the slot 17 and engaging in the fixed framework 12. The distance of the belts from the circular saws is adapted to be suitably adjusted by removing a link or two from the belts or inserting such links therein and correspondingly displacing the members 18 carrying the sprockets at this end of the belts, by means of adjusting screws 19; after the adjustment, the member 18 is fixed in position by the screw 20 passing through the slot 21 and engaging in the framework 13.

The distance between the belts 5, 6 is automatically adjusted according to the size of the tops by their being pressed aside against the action of springs 22 (see Figure 4). Referring to this figure, the member 14 of the framework 13, 14 is attached to a plate 23 welded at 24' to collars 24 (see also Figure 2) turning on a fixed axle 25 attached by a web 26 to the frame 12.

The drive of the sprockets 8 is derived from the shaft 39 through the chain and sprocket 27, bevel gearing 28 and universal joints 15 (see Figure 3).

Referring to Figure 2, A is a conveyer disposed transversely with respect to the machine to receive the tops when they reach the summit of the endless belts 5, 6 and are discharged therefrom. The conveyor consists of a frame 29 on which are mounted sprocket driven endless chains 30 having secured thereto slats 31 arranged to sweep along and off the beet tops dropping on the top of the frame 29 which is provided with a grid of longitudinal rods 32. The conveyor frame is adapted to be displaced transversely with respect to the machine according to requirements, for which purpose it is provided with rods or tubes 33 along which it is slid between rollers 34 mounted on members 35, attached to the chassis 36, by which members the whole of the conveyor is suspended from the machine. 37 is the driving gear of the conveyor which is derived through chain and sprocket 38 from the shaft $n$ (the connections are not shown).

The details for carrying the invention into effect may be modified without departing from its scope.

We claim:

1. In a machine for harvesting beet and like root crops in which the cutting of the beet and the like is effected by means of circular saws, a floating topping unit, the said topping unit comprising in combination with the circular saws a locating device mounted above and in front of the circular saws and consisting of two pairs of wheels one pair arranged in front of and higher than the other pair and the first pair lying between the two wheels of the other pair, whereby upon the front and higher pair of wheels locating the top of the beet or the like the other rear and lower pair of wheels will ride over the shoulder of the beet or the like thereby determining the cutting position of the circular saws.

2. In a machine for harvesting beet and like root crops in which the cutting of the beet and the like is effected by means of circular saws, a topping unit as claimed in claim 1 comprising driving means for the rear and lower pair of wheels of the locating device, the other front and higher pair being free moving.

FREDERICK JOHN MINNS.
STANLEY ALBERT FRANK COURT.
NORMAN ELLYARD LANGDALE.

REFERENCES CITED

The following references are of record in the file of this patent:

UNITED STATES PATENTS

| Number | Name | Date |
| --- | --- | --- |
| 696,262 | Palmer | Mar. 25, 1902 |
| 709,720 | Palmer | Sept. 23, 1902 |
| 1,076,363 | Harrison | Oct. 21, 1913 |
| 1,225,841 | Meek | May 15, 1917 |
| 1,646,680 | Bright | Oct. 25, 1927 |
| 2,314,681 | Beatty | Mar. 23, 1943 |
| 2,337,698 | Walz | Dec. 28, 1943 |
| 2,433,799 | Walz et al. | Dec. 30, 1947 |